(12) United States Patent
Gerchberg

(10) Patent No.: US 6,369,932 B1
(45) Date of Patent: Apr. 9, 2002

(54) SYSTEM AND METHOD FOR RECOVERING PHASE INFORMATION OF A WAVE FRONT

(75) Inventor: Ralph W. Gerchberg, Ardsley, NY (US)

(73) Assignee: Wavefront Analysis Inc., New York, NY (US)

( * ) Notice: Subject to any disclaimer, the term of this patent is extended or adjusted under 35 U.S.C. 154(b) by 0 days.

(21) Appl. No.: 09/708,290

(22) Filed: Nov. 8, 2000

Related U.S. Application Data

(60) Provisional application No. 60/163,978, filed on Nov. 8, 1999.

(51) Int. Cl.$^7$ ............................................. G02B 26/00

(52) U.S. Cl. ........................ 359/237; 359/279; 359/299; 250/550

(58) Field of Search ............................... 359/237, 279, 359/299, 300, 559; 250/550

(56) References Cited

U.S. PATENT DOCUMENTS

| | | | | |
|---|---|---|---|---|
| 4,330,775 A | * | 5/1982 | Iwamoto et al. | 340/146.3 |
| 5,426,521 A | * | 6/1995 | Chen et al. | 359/9 |
| 6,222,986 B1 | * | 4/2001 | Inuiya | 386/117 |

OTHER PUBLICATIONS

R. W. Gerchberg, "The lock problem in the Gerchberg–Saxton algorithm for phase retrieval," *Optik*, vol. 74, No. 3, (1986) pp. 91–93.

Gerchberg et al., "A Practical Algorithm for the Determination of Phase from Image and Diffraction Plane Pictures," Cavendish Laboratory, Cambridge, England, *Optil* vol. 35, No. 2, (1972) pp. 237–246.

Gerchberg et al., "Phase Determination from Image and Diffraction Plane Pictures in the Electron Microscope," Cavendish Laboratory, Cambridge, England *Optik*, vol. 34, No. 3, (1971) pp. 275–284.

Erickson et al., "The Fourier Transform of an Electron Micrograph: Effects of Defocussing and Aberrations, and Implications for the Use of Underfocus Contrast Enhancement," Medical Research Council Laboratory of Molecular Biology, Cambridge, England, Berichte der Bunsen–Gesellschaft, Bd. 74, Nr. 11, (1970) pp. 1129–1137.

(List continued on next page.)

*Primary Examiner*—Georgia Epps
*Assistant Examiner*—Tim Thompson
(74) *Attorney, Agent, or Firm*—Pennie & Edmonds LLP

(57) ABSTRACT

A system and method for recovery of phase information from recorded intensity values is disclosed. A phase filter, such as one or more dioptric lenses, is placed in the back focal plane (BFP) of a lens used for observing an object. The phase filter changes the phase of a wave front distribution in the BFP in a known manner. The system captures N different sets of intensity data in the image plane (IP) using N different phase filters or N phase distributions generated by an electronically variable phase filter. The N intensity images are used to obtain an estimate of the wave front at the BFP of the lens. This BFP wave front estimate is then used to generate N modified estimates of the wave front at the IP, each modified estimate corresponding to one of the N phase distributions of the BFP phase filter(s). In one implementation, the N modified IP estimates are corrected by replacing the estimated amplitudes with the actually measured ones for that image. The process is repeated iteratively until an error measure between the measured values and the synthetically generated ones falls below a known threshold. A separate intensity measurement of the wave front at the BFP can be used to speed up the convergence of the process. The resulting phase estimates can be used to display wave front information similar in appearance to holograms

56 Claims, 9 Drawing Sheets

OTHER PUBLICATIONS

Cooley et al., "An Algorithm for the Machine Calculation of Complex Fourier Series," Machine Calculation of Complex Fourier Series, Received Aug. 17, 1964. Research in part at Princeton University under teh sponsorship of the Army Research Office (Durham). pp. 297–301.

Fienup et al., "Phase–retrieval stagnation problems and solutions," J. Opt. Soc. Am. A, vol. 3, No. 11, (Nov. 1986) pp. 1897–1907.

D. Gabor, "A New Microscopic Principle," *Nature*, No. 4098, (May 15, 1948) pp. 777–778.

W. O. Saxton, "Computer Techniques for Image Processing in Electron Microscopy," Advances in Electronics and Electron Physics, Supplement 10, Academic Press pp. 51–52.

* cited by examiner

SYSTEM AND METHOD FOR RECOVERING PHASE INFORMATION OF A WAVE FRONT

This application claims benefit to Provisional Application No. 60/163,978 filed Nov. 8, 1999.

FIELD OF THE INVENTION

The present invention is generally directed to a system and method for recovering wave front phase information and using the recovered information for display, and more particularly to a system and method for determining the phase function from measured intensity information.

BACKGROUND OF THE INVENTION

In a coherent monochromatic imaging system the problem of extracting phase information from a detection medium which records only intensity information remains a problem without a consistent solution. Several have proposed experimental methods for determining the phase function across the wave front. One such method disclosed in Gabor, D. "A New Microscope Principle", Nature 161, 777 (1948) involves the addition of a reference wave to the wave of interest in the recording plane. The resulting hologram records a series of intensity fringes, on a photographic plate, which contain enough information to reconstruct the complete wave function of interest. However, in most practical applications this method is cumbersome and impractical to employ.

Other methods, which did not employ reference waves, have been proposed for inferring the complete wave function from intensity recordings. See, e.g., Erickson, H. & Klug, A. "The Fourier Transform of an Electron Micrograph: . . . ", Berichte der Bunsen Gesellschaft, 74, 1129 (1970). For the most part these methods have involved linear approximation and thus are only valid for small phase and/or amplitude deviations across the wave front of interest. In general, these methods also suffer from the drawback of requiring intensive computational resources.

A further method proposed that intensity recordings of wave fronts can be made conveniently in both the imaging and diffraction planes. Gerchberg, R. & Saxton, W. "Phase Determination in the Electron Microscope," Optik, 34, 275 (1971). The method uses sets of quadratic equations that define the wave function across the wave in terms of its intensity in the image and diffraction planes. This method of analysis is not limited by the above-described deficiency of small phase deviations, but again, it requires a large amount of computational resources.

In 1971 the present inventor co-authored a paper describing a computational method for determining the complete wave function (amplitudes and phases) from intensity recordings in the imaging and diffraction planes Gerchberg, R. & Saxton, W. "A Practical Algorithm for the Determination of Phase . . . ," Optik, 35, 237 (1972). The method depends on there being a Fourier Transform relation between the complex wave functions in these two planes. This method has proven to have useful applications in electron microscopy, ordinary light photography and crystallography where only an x-ray diffraction pattern may be measured.

The so-called Gerchberg-Saxton solution is depicted in a block diagram form in FIG. 1. The input data to the algorithm are the square roots of the physically sampled wave function intensities in the image 100 and diffraction 110 planes. Although instruments can only physically measure intensities, the amplitudes of the complex wave functions are directly proportional to the square roots of the measured intensities. A random number generator is used to generate an array of random numbers 120 between $\pi$ and $-\pi$, which serve as the initial estimates of the phases corresponding to the sampled imaged amplitudes. If a better phase estimate is in hand a priori, that may be used instead. In step 130 of the algorithm, the estimated phases 120 (represented as unit amplitude "phasors") are then multiplied by the corresponding sampled image amplitudes from the image plane, and the Discrete Fourier Transform of the synthesized complex discrete function is accomplished in step 140 by means of the Fast Fourier Transform (FFT) algorithm. The phases of the discrete complex function resulting from this transformation are retained as unit amplitude "phasors" (step 150), which are then multiplied by the true corresponding sampled diffraction plane amplitudes in step 160. This discrete complex function (an estimate of the complex diffraction plane wave) is then inverse Fast Fourier transformed in step 170. Again the phases of the discrete complex function generated are retained as unit amplitude "phasors" (step 180), which are then multiplied by the corresponding measured image amplitudes to form the new estimate of the complex wave function in the image plane 130. The sequence of steps 130–180 is then repeated until the computed amplitudes of the wave forms match the measured amplitudes sufficiently closely. This can be measured by using a fraction whose numerator is the sum over all sample points in either plane of the difference between the measured and computed amplitudes of the complex discrete wave function squared and whose denominator is the sum over all points in the plane of the measured amplitudes squared. When this fraction is less than 0.01 the function is usually well in hand. This fraction is often described as the sum of the squared error (SSE) divided by the measured energy of the wave function: SSE/Energy. The fraction is known as the Fractional Error.

A theoretical constraint on the above described Gerchberg-Saxton process is that the sum squared error (SSE), and hence the Fractional Error, must decrease or at worst remain constant with each iteration of the process.

Although the Gerchberg-Saxton solution has been widely used in many different contexts, a major problem has been that the algorithm can "lock" rather than decrease to a sum square error (SSE) of zero. That is to say, the error could remain constant and the wave function, which normally develops with each iteration, would cease to change. The fact that the SSE cannot increase may in this way trap the algorithm's progress in an "error well." See Gerchberg, R. "The Lock Problem in the Gerchberg Saxton Algorithm for Phase Retrieval," Optik, 74, 91 (1986), and Fienup, J. & Wackermnan, C. "Phase retrieval stagnation problems and solutions," J. Opt. Soc. Am.A, 3, 1897 (1986). Another problem with the method became apparent in one dimensional pictures where non-unique solutions appeared. Furthermore, the algorithm suffers from slow convergence. To date, there are no alternative satisfactory solutions to these problems with the Gerchberg-Saxton method. Accordingly, there is a need for a system and method that can recover wave front phase information without the drawbacks associated with the prior art.

SUMMARY OF THE INVENTION

The method of the present invention is driven by an "error reduction" principle and requires a plurality of samples of the wave front from the object being observed. The method relies on the fact that the back focal plane of a convergent lens on which the scattered wave from the object impinges contains a wave function, which is directly proportional to the Fourier Transform of the object and is therefore directly proportional to the Fourier Transform of the image plane wave function of the object. In the case where the phase difference from one pixel to any of its neighboring pixels only changes slightly, prior art methods were computationally intensive in trying to distinguish between these slight phase differences. Since the actual back focal plane (BFP) wave transforms to the true image in the Image Plane, by the intervention of the drift space between these two planes (mathematically causing the BFP wave to undergo Fourier Transformation yielding the Image Plane wave), we have one very useful relationship between the measurements in these two conjugate planes. However, other relationships between the waves in these two planes are achievable by changing the phase distribution only (not the amplitude distribution) in the BFP. This can be accomplished by using known but physically different phase filters, in the BFP, whose effects on the BFP phase distribution are known. It is noted that there are other physical methods of effectively changing the phase in the BFP (e.g., the use of defocus). The Image Plane wave resulting from this intervention can be very different from the true object wave consequently yielding new relationships between intensity measurements in these two conjugate planes. The present invention uses several of these new "synthesized" relationships to drastically reduce computation of the reconstructed wave form, to avoid stagnation in the iterating algorithm, and to avoid certain well known ambiguities in the reconstructed wave function.

In one embodiment of the present invention, a random phase filter is inserted into the Back Focal Plane (BFP) of a convergent lens. This phase filter changes the phase for pixels in the BFP in a known way thereby changing the resulting image in the Image Plane. The phase distribution of the individual pixels in the BFP can be selected randomly, or according to a desired distribution. In an alternative embodiment of the invention, conventional convergent and/or divergent lenses can be used as phase filters.

Using the above filter(s), N different sets of amplitude (intensity) data are obtained from the image plane. That is to say, N different images of the object are created in the image plane. It is noted that in an alternative embodiment of the present invention, wave intensities may be recorded in the BFP as well. Next, each of the N intensity images is processed to obtain a "synthetic" wave front using the intensity values measured at the Image Plane and phase values that could be random, or may be selected based on prior knowledge. As a practical matter any initial phase estimate values will work although, for convenience, initially the phase for each complex pixel can be assumed to be zero. The resulting wave function for each of the N images is then inverse Fourier transformed (using standard fast algorithms), and the known phase shift of each of the corresponding BFP filters is subtracted from each pixel. This is done in turn for each of the N images to obtain N estimates of the wave function at the BFP. The resulting BFP estimates are saved for each of the N images. Then, in accordance with a preferred embodiment these BFP estimates are averaged to obtain a single BFP estimate of the complex BFP wave front.

In an alternative embodiment of the present invention, in which BFP intensity data have been measured along with the N IP images, the amplitude of the BFP wave estimate is changed to the measured amplitude distribution at this point in the iterative process. Then for each of the N IP images, the phase shift of its corresponding filter is added in turn to the single BFP estimate and the N different BFP estimates (differing by the N different phase filter effects) are Fourier transformed to generate N estimates of the wave function at the image plane. Each of the N estimates are then corrected using the actually measured amplitude for that particular image. This correction results in an error value. The above process then is repeated in an iterative fashion until the SSE of all N images is sufficiently small for the purposes of the application. In a typical case, less than 1% of the energy of all N images (i.e., the fractional Error is less than 1%) can be used.

BRIEF DESCRIPTION OF THE DRAWING(S)

For the purposes of illustrating the present invention there is shown in the drawings a form which is presently preferred, it being understood however, that the invention is not limited to the precise form shown by the drawings in which.

DETAILED DESCRIPTION OF THE INVENTION

The present invention generally applies to propagating wave fronts, along whose path of propagation two planes exist in which the complex wave distributions are related by a transform, which generally would be linear, invertible and energy conservative, such as a Fourier transform. These two planes will also be referred to as conjugate planes. Such conjugate planes exist, for example, between an electromagnetic antenna aperture and its far field (Fraunhofer) plane, or between the object plane and the back focal plane of a convergent lens imaging the object plane, or between the back focal plane of a light camera's objective lens and the camera's image plane, or between the diffraction and the image planes of a transmission electron microscope, or between an X-ray illuminated crystal structure and its diffraction plane and so on. Given that the ability of recording media is limited to recording only the intensity distribution in these planes, the need arises to recover the phase distribution across these planes as well. The wave front is a complex function across a plane comprising intensity/amplitude and phase. In this disclosure, for the purpose of brevity, the two planes are referred to as the back focal plane(BFP) of a light camera and its corresponding image plane (IP). As noted above, the wave front in the image plane is proportional to the Fourier Transform (FT) of the wave in the camera's back focal plane (BFP).

Although the preferred embodiment of the present invention is described in terms of recovering phase information for a wave front in the visible electromagnetic spectrum, the present invention is not so limited and can also be applied to other regions of the spectrum, such as x-ray, infrared, electron microscopy, sonar, etc. Generally, the method is effective in any context in which the scalar wave equation yields a sufficiently accurate picture of the physics of a context. In addition, one needs a physical mechanism of altering the phase of the wave at the object/diffraction plane in a known way to yield different synthesized intensities in the downstream diffraction/image plane.

Figure 1:
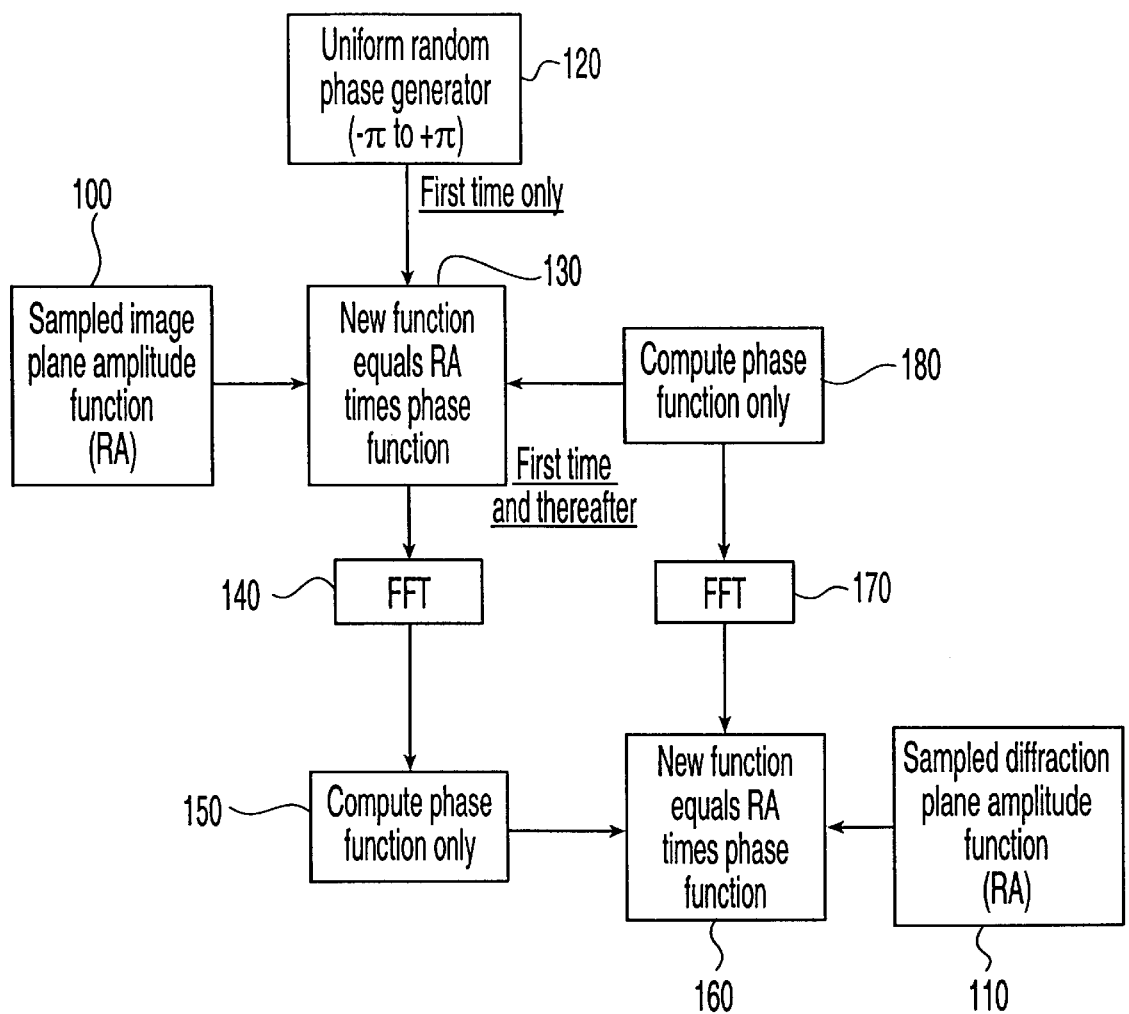
FIG. 1 illustrates a prior art method for recovering phase information.
Figure 2:
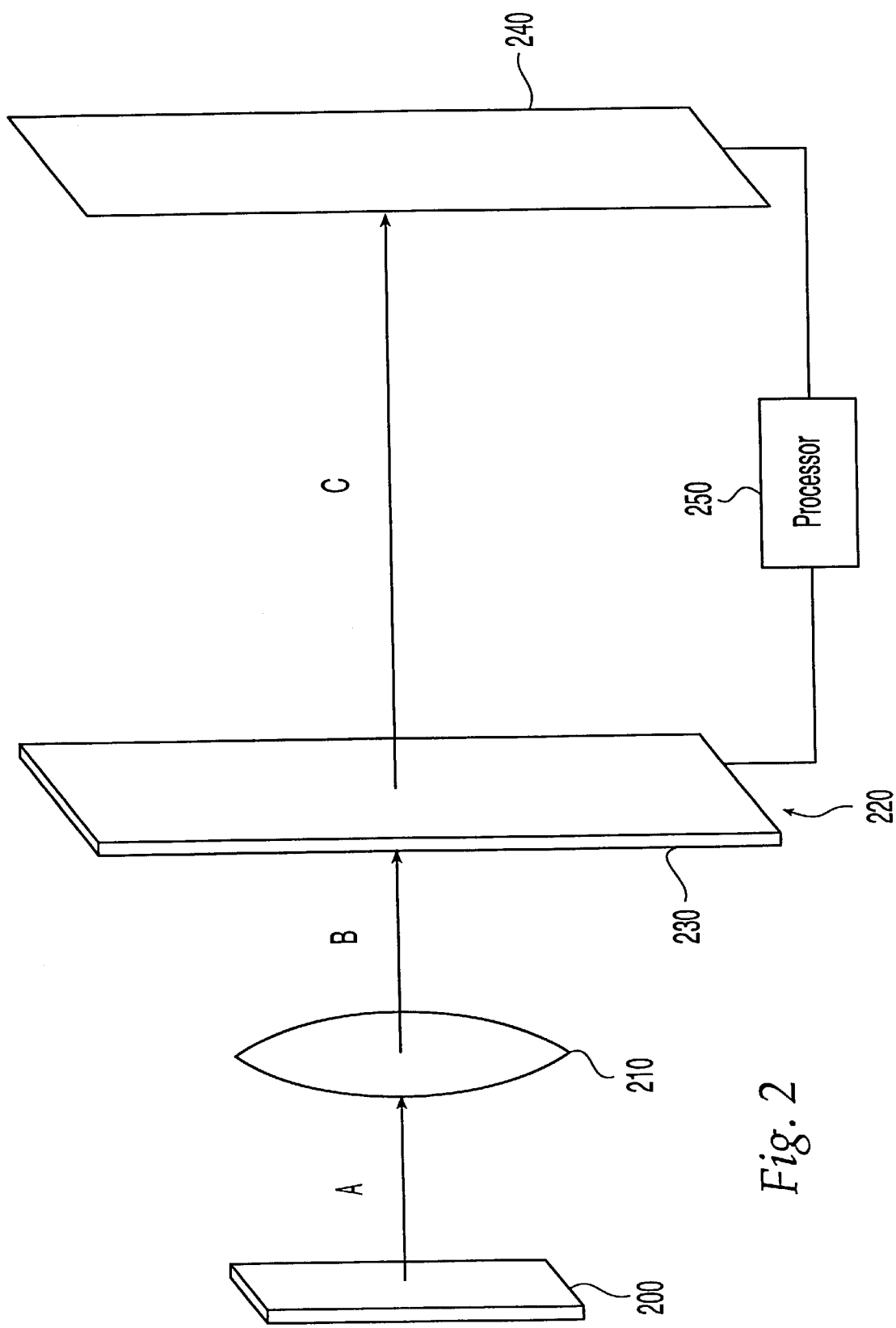
FIG. 2 illustrates an apparatus for obtaining intensity data according to one embodiment of the present invention.

FIG. 2 illustrates an apparatus for obtaining intensity data in accordance with a preferred embodiment of the present invention. Element 200 represents an object which is to be imaged. This object can either be transparent and therefore backlit, or can be illuminated to reflect light. In a preferred embodiment, the light from the object is monochromatic coherent light illustrated in FIG. 2 as ray A. In alternative embodiments of the present invention, as dictated by the specific practical application, instead of a purely monochromatic coherent source, one can use a partially coherent light source, where instead of a point source the system uses a distributed source. (Broadly speaking, light from a distributed source shone through a screen with two holes will generate on a wall behind the screen fringes that are not completely constructive/destructive but become blurred with distance). In another alternative embodiment, one can use a pseudo-monochromatic light source, which emits in a narrow bandwidth. The feasibility of using these alternative-embodiment light sources will be determined by specific applications.

With further reference to FIG. 2, the light A from the object 200 is converged into light B using a lens (or a system of lenses) 210. For example, in the case of visible light, a convergent lens with a convenient focal length would be useful while in the context of electron microscopy, a magnetic lens would be appropriate. What type of lens 210 is used will be determined by the application, the only constraint being that it generates the pair of conjugate BFP and IP planes.

Element 220 in FIG. 2 represents the BFP of the lens 210. A phase filter 230 is placed at the position of the BFP 220 in the illustration in FIG. 2. The complex wave function that forms in the diffraction or BFP 220 is capable of having its intensity captured and recorded in the usual way for the selected medium. For example, in the case of visible light, X-rays or electron beams, exposing photographic film directly to the complex wave is a useful recording technique. A charged coupled device (CCD) array may also be used to capture the image at the BFP 220. Digital recording directly is also appropriate in many applications, as will be recognized by those of skill in the art.

Phase filter element 230 represents one or more phase filters inserted at the BFP 220. Generally, filter 230 is used to generate a plurality of image intensity data required by the method of the present invention. In one embodiment, the phase filter 230 is a random phase plate with uniform distribution. Other random phase filters with other distributions may also be used. The random phase plate 230 randomly changes the phase of a pixel by anything from $-\pi$ to $+\pi$. For example, if the phase of one pixel was 10 degrees and its neighboring pixel had a phase of 11 degrees, after passage through the random phase plate 230, the phases of these two pixels might be $-75$ degrees and $+34$ degrees. Although the amount of phase shift experienced by each pixel may be random with respect to its neighboring pixels, in accordance with the present invention the amount of phase shift applied to each of the pixels is a known quantity.

In summary, the light in the BFP 220 is altered by the phase filter 220. This is done on a pixel by pixel basis resulting in no change in the complex wave front amplitude/intensity exiting from the BFP 220, but with possibly considerable change in its "invisible" phase distribution. Then, after passing through the space between the BFP 220 and the image plane 240 (see ray C in FIG. 2), the effect of the phase filter 230 is seen in the recorded intensity image at the image plane 240. The image recorded at the image plane 240 does not resemble the original object 200 because of the phase changes introduced by the phase filter 230. Thus, for example, at the image plane 240 the image of a transparent phase object 200 is not a featureless uniform intensity image. Nor does it necessarily resemble the original phase of the object 200.

It is desirable, though not necessary, that the cross correlation between the different filters 230 used to obtain the plurality of images is between +0.1 and -0.1. In different embodiments of the present invention, conventional optics can also be used as the phase filter 230. For example, in one series of computer simulations, nine lenses were used as phase filters 230 beginning with the first filter being a plus eight diopter lens and progressing in eight diopter increments so that the ninth filter lens was 72 diopters. In another, preferred embodiment of the invention, spatial light modulators of the type made available by Boulder Nonlinear Systems, Inc. can be used as phase filter 230. At present, these modulators are available in arrays of 128×128 or 256×256 pixels and may introduce variable phase change on a pixel-by-pixel basis. In a specific embodiment, the modulator can introduce phase change fixed to $+\pi$ or 0 (a binary phase filter). In alternative embodiments the amount of phase change can be arbitrary, although this may result in some loss of speed.

Element 240 represents the image plane of the apparatus of the present invention. The image focused on image plane 240 can be captured by any suitable calibrated recording medium, such as photographic film or a charged couple device (CCD) array. The image recorded at the image plane 240 is measured in terms of the intensity of the light falling on the image plane 240. It will be appreciated that the amplitudes of the sampled image are proportional to the square roots of the measured intensities.

The series of different images captured at the image plane 240 using the phase filters 230, shall for purposes of this discussion be termed "phasorgrams." Phasorgrams are synthetic intensity images of the complex wave form in the image plane induced by applying shifting of phase filter 230 to the BFP 220 wave function. The complex wave function at the image plane 240 usually does not resemble the actual object 200 either in amplitude or phase distribution. Essentially, phasorgrams are intensity pictures resulting from experiments carried out at the BFP 220 by the different phase filters 230. The intensity data representing the phasorgrams and the knowledge of the filter(s) 230 which created them provide the data required by the new algorithm shown as FIG. 3 to solve for the phase distribution of the object 200.

As shown in FIG. 2, the BFP 220 and the image plane 240 are coupled to a processor 250. This direct coupling represents the embodiment where the intensities of the BFP image and the images at the IP 240 are captured using an electronic device, such as the previously described CCD array. If photographic film is used to capture the images, the coupling of the film to the processor 250 can be achieved through a calibrated optical scanning process (not shown). The software for executing the algorithm of FIG. 3 and the distribution of the known phase shifts of the phase filters 230 are preloaded into the processor 250. As will be more fully described below, in one embodiment of the present invention, intensity data are only measured at the image plane 240 and not at the BFP 220. In this embodiment, there would be no need for a connection between the BFP 220 and the processor 250. Naturally, it will be appreciated that in the case of using a phase filter of the type available from Boulder Nonlinear Systems, Inc., the processor may be used to select the phase angle introduced by the filter for a particular measurement.

Figure 3:
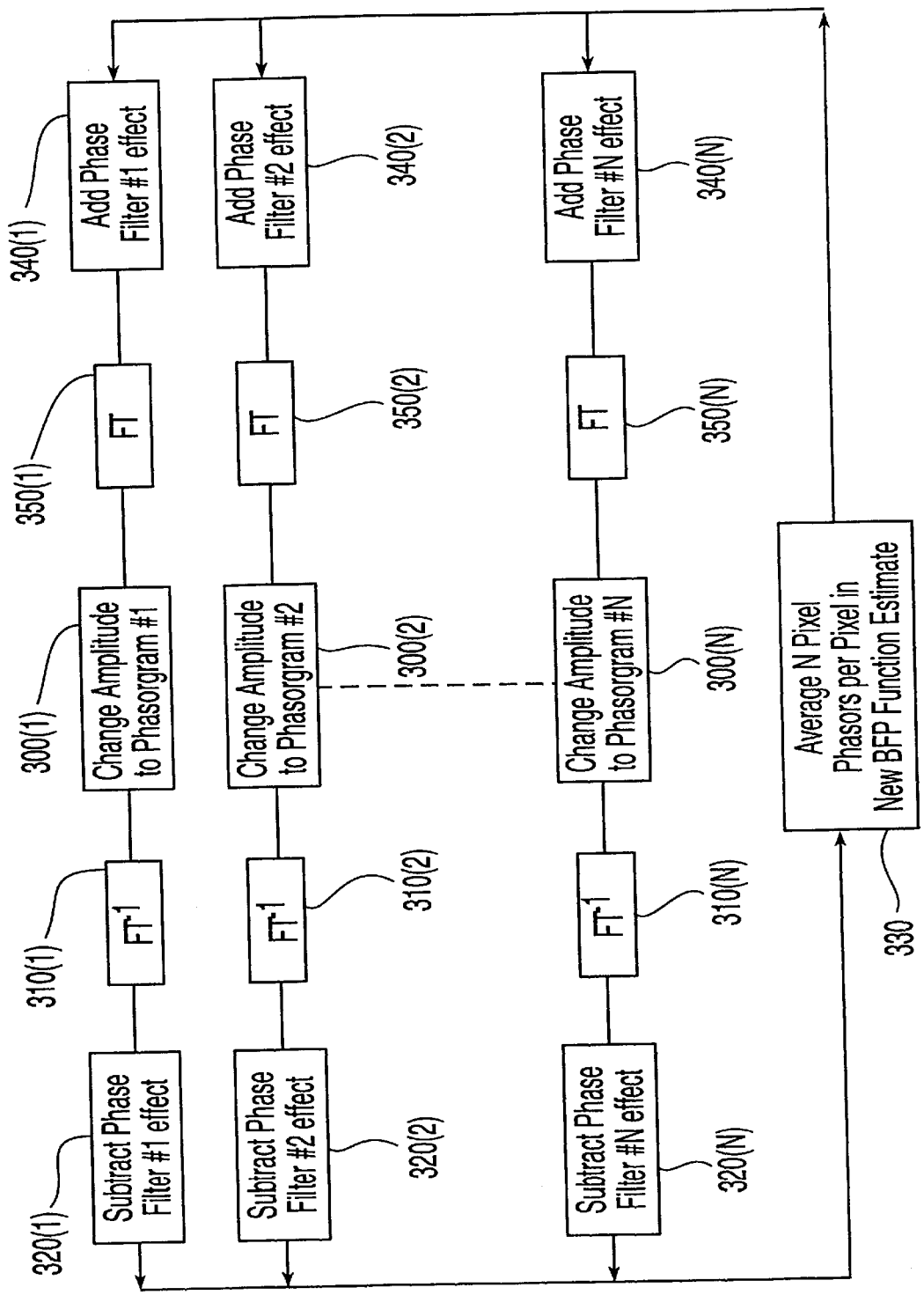
FIG. 3 illustrates in a block diagram form a preferred embodiment of the method of the present invention.
Figure 4A:
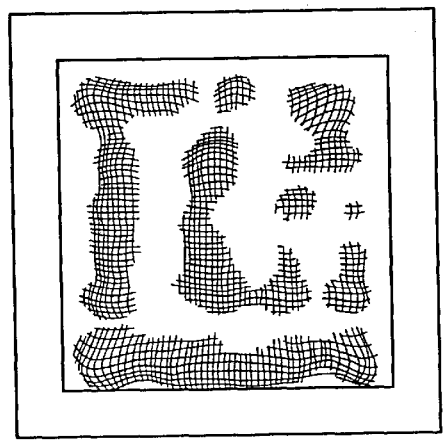
FIGS. 4A–4F show six perspective gray scale image intensity representations obtained using the apparatus of FIG. 2 with a transparent object (a pure phase object)
Figure 4B:
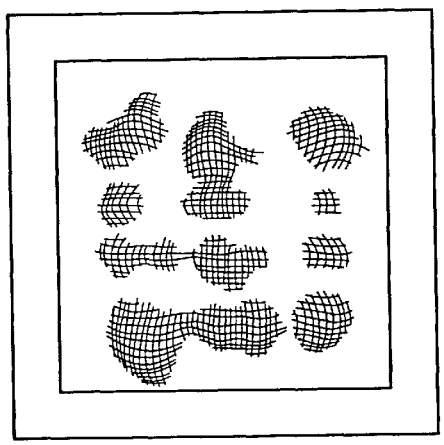
Figure 4C:
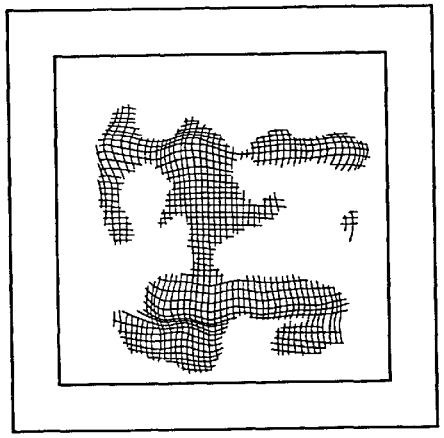
Figure 4D:
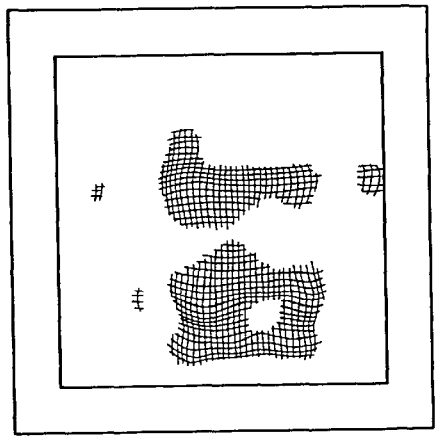
Figure 4E:
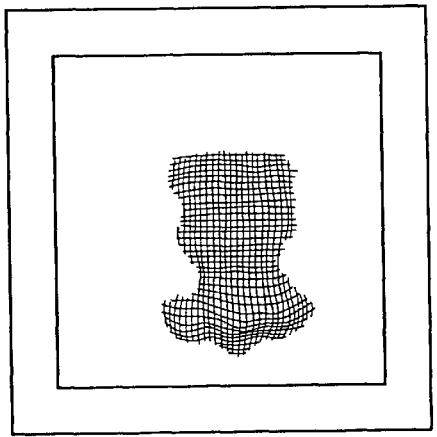
Figure 4F:
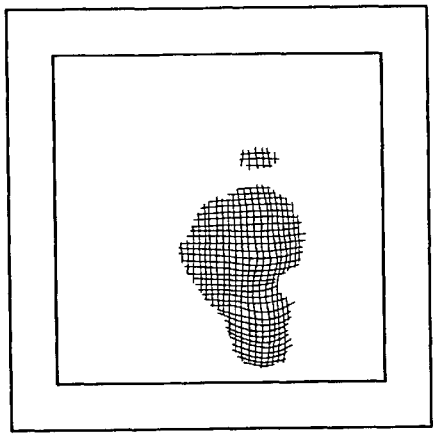

FIG. 3 depicts one embodiment of the process of the present invention for recovering the phase information related to object 200. As previously described, the apparatus of FIG. 2 is used to obtain intensity measurements for N different images, phasorgrams, of object 200 obtained using the phase filter(s) 230. In accordance with the preferred embodiment, the measured intensities for the N different phasorgrams are stored in a memory of the processor 250 along with the phase shifts introduced by the phase filter(s) 230.

In accordance with a preferred embodiment, step 300 is the starting point for the initial iteration of the process of the present invention. For the initial iteration, the amplitudes measured at the image plane 240 (amplitude is the square root of the measured intensity) are used. It is usually assumed for convenience that the phase for each pixel is zero. In other words, the complex wave function in the image plane 240 is assumed to be purely real. If better information exists, then the initial phase distribution estimate should be in accord with it. In the initial iteration no correction is made to the amplitudes of the N phasorgrams.

In step 310(i) inverse Fast Fourier Transform is applied to each of the N phasorgrams. This can be achieved using the Fast Fourier Transform Algorithm of Cooley and Tukey which is well known to those engaged in the art of Image Processing. See Cooley, J. & Tukey, J. Mathematics of Computation, 19, 297 (1965). It will be appreciated that inverse transforming the individual phasograms can be performed either in parallel (where speed is of the essence) or sequentially. Thus, index (i) in step 310 in FIG. 3 should be interpreted to cover both embodiments. Accordingly, with reference to FIG. 2, depending on the type of processor 250 used, the inverse Fourier transform can be computed either sequentially for each of the N phasorgrams (i=1, ..., N) or can be performed in parallel.

In step 320, the known phase shift for each pixel, which is contributed by its corresponding phase filter 230 (FIG. 2), is subtracted from the resulting complex wave function. As in the case of the inverse Fourier transform computation, this operation for each complex wave function (i=1, ..., N) can be done either sequentially or in parallel. The result of the subtraction step 320 is an estimate of the complex wave at the conjugate BFP 220. (Please refer to FIG. 2 for clarity).

In the following processing step these N estimates are saved in a computer memory. In accordance with the embodiment illustrated in FIG. 3, no actual data which could have been measured at the BFP 220 (FIG. 2) is used.

In a preferred embodiment, the N complex wave estimates in the BFP 220 are then summed and the sum is divided by N in step 330 to obtain a single averaged estimate of the BFP complex wave function. Using this estimate, the known phase shift for each pixel contributed by its corresponding filter is then added back to yield N different wave forms of equal amplitude distribution but with different phase distributions (step 340). Alternatively, if intensity data have been measured at the BFP 220, the measured amplitude data are used to correct the amplitude of the averaged estimated complex wave function at step 330 as well.

After the known phase shift for each pixel contributed by its corresponding filter has been added to yield N different wave forms in step 340, the N wave forms are each Fast Fourier Transformed (step 350) to yield N new estimates of the complex wave in the conjugate image plane 240. Each of these estimates are then corrected to have the corresponding amplitude distribution as its measured phasorgram (step 300). The phase distribution at this point is not modified.

Once the estimated image plane wave forms have been corrected with respect to the actually measured phasorgram amplitude distributions, the process steps 300–350 are repeated until the amount of correction necessary in step 300 is reduced below some threshold. In most cases that occurs when the Fractional Error, that is the SSE over all N images divided by the amplitudes squared over all N images (the total energy), is less than 0.0001.

The procedure described with respect to FIG. 3 is guaranteed to reduce or at worst maintain the Sum of the Squared Error (SSE) defined by the difference in the estimated amplitude for each pixel and its measured value in the phasorgram, for all the pixels in all N phasorgrams. In contrast to the methods of the prior art, by using the method of the present invention it is possible for the "partial" SSE taken over any but not all the N phasorgrams to actually increase from one iteration to the next. However, the total SSE (summed over all phasorgrams) can not increase from one iteration to the next.

FIGS. 4A–4F depict perspective gray-scale representations of 6 images (phasorgrams) obtained by using the apparatus of FIG. 2. These computed images simulate photographing a transparent phase object 200 (FIG. 2) through a series of 6 different dioptric lenses 230 (FIG. 2) placed successively in the BFP 220. The differences in the images 4A–4F are due solely to the different lenses 230 used. But for the insertion of lenses 230, all of the images would have been white, as the object 200 was transparent. The image plane 240 used in the first experimental set up was sampled on a 16×16 square grid. Satisfying the requirements of the fast Fourier Transform algorithm of Cooley and Tukey there were then 256 pixels in a 16×16 grid in the BFP 220 also.

The first experiment was performed using an object 200 which was transparent but had a graphically recognizable phase function. Again, phase is not detectable with intensity recording media nor with a human eye. Thus, the object and its graphically recognizable phase distribution were invisible. The phase distribution was in the form of a block letter "G" at a constant phase value of 3.0 radians set in a field whose phase in radians is given by:

$$\text{theta}(r,c) = (r^3 + 0.5\ c^3)/810 - 3.14159$$

where
- r=the row number of the 16 by 16 picture matrix (0 to 15)
- c=the column number of the 16 by 16 picture matrix (0 to 15)

A second experiment was conducted using a second object 200, which was again transparent but with the phase for each object pixel this time chosen from a uniform random distribution spanning the range between $-\pi$ and $+\pi$. That is, each pixel was totally independent in phase from any of the other pixels.

In each of these two experiments, a series of 6 convergent dioptric lenses was used as phase filters 230 (FIG. 2) and intensity measurements were taken at the image plane 240. These lenses 230 added to the phase of the wave function in the BFP according to:

$$NR^2/10$$

where
- n is integer from 1 to N for each different lens filter; and
- R is the radius of the pixel in the back focal plane.

Yet another, a third experiment, using the same random phase object 200 of the second experiment was conducted. For the third experiment, a series of random phase filters 230 replaced the dioptric filters of the first two experiments. The random phase filters 230 shifted the phase of each pixel in the back focal plane according to a uniform distribution between $+\pi$ and $-\pi$. Each random phase filter used in this series had a cross correlation figure between +0.1 and −0.1 with respect to any of the other filters in the series.

Figure 5A:
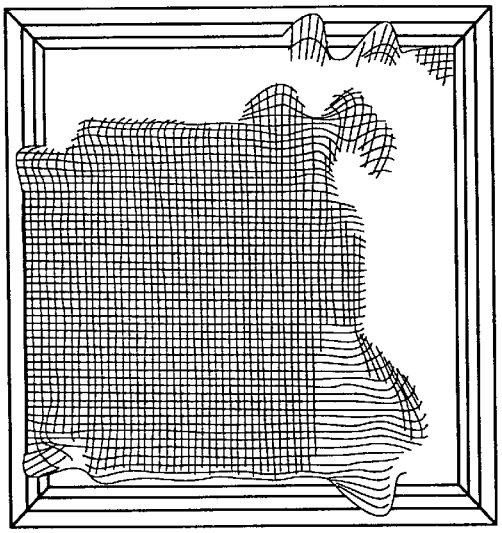
FIGS. 5A–5D are perspective gray scale representations of the phase of a particular transparent object as it develops during the course of iterations in one embodiment of the method of this invention.
Figure 5B:
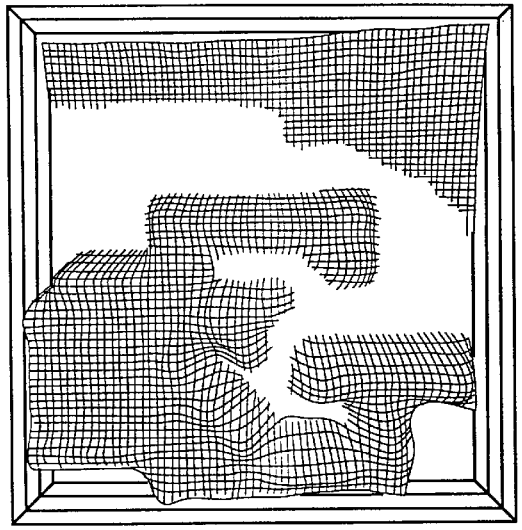
Figure 5C:
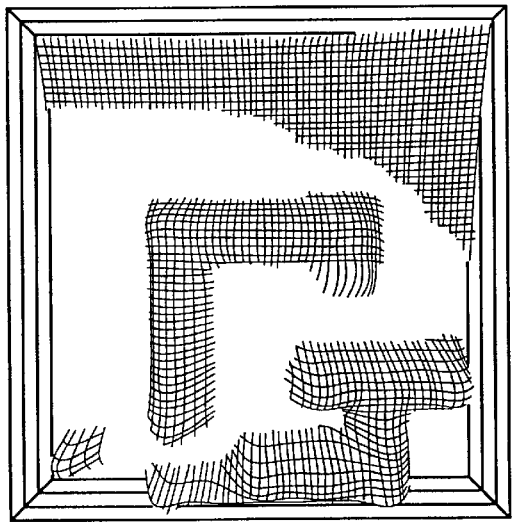
Figure 5D:
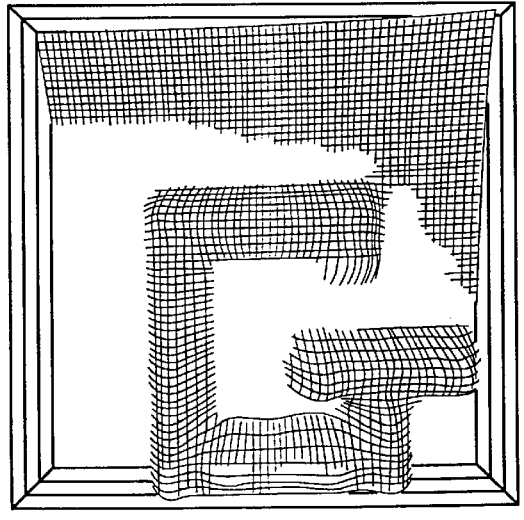

FIGS. 5A–5D illustrate the progress of the algorithm (FIG. 3) as it recovers the phase distribution of the object 200. Shown are the phase estimates, as the number of cycles of the algorithm increase, in the first experiment. FIG. 5A illustrates the phase estimate after 10 iterations of the process steps 300–350. FIG. 5B illustrates the same after 90 iterations while FIG. 5C and 5D illustrate the phase estimate after the 114th and the 126th iterations respectively.

As clearly illustrated in FIG. 5D, the method of the present invention was able to recover the phase information for the wave front emanating from the transparent object 200.

The initial phase estimate, which is not illustrated in FIG. 5, would be uniformly white since the function is initially assumed real. After the 10th estimate illustrated in FIG. 5A, the fractional error between the estimated function and the measured function was 5%. After the 90th estimate illustrated in FIG. 5B the fractional error was 0.8%. After the 114th iteration, the fractional error was reduced to 0.09% and in the final estimate illustrated in FIG. 5D, the fractional error was a mere 0.01%. These fractional errors are measured as the total error energy (the sum of the SSE over all six phasorgrams) divided by the total phasorgram energy (over all six phasorgrams).

Figure 6:
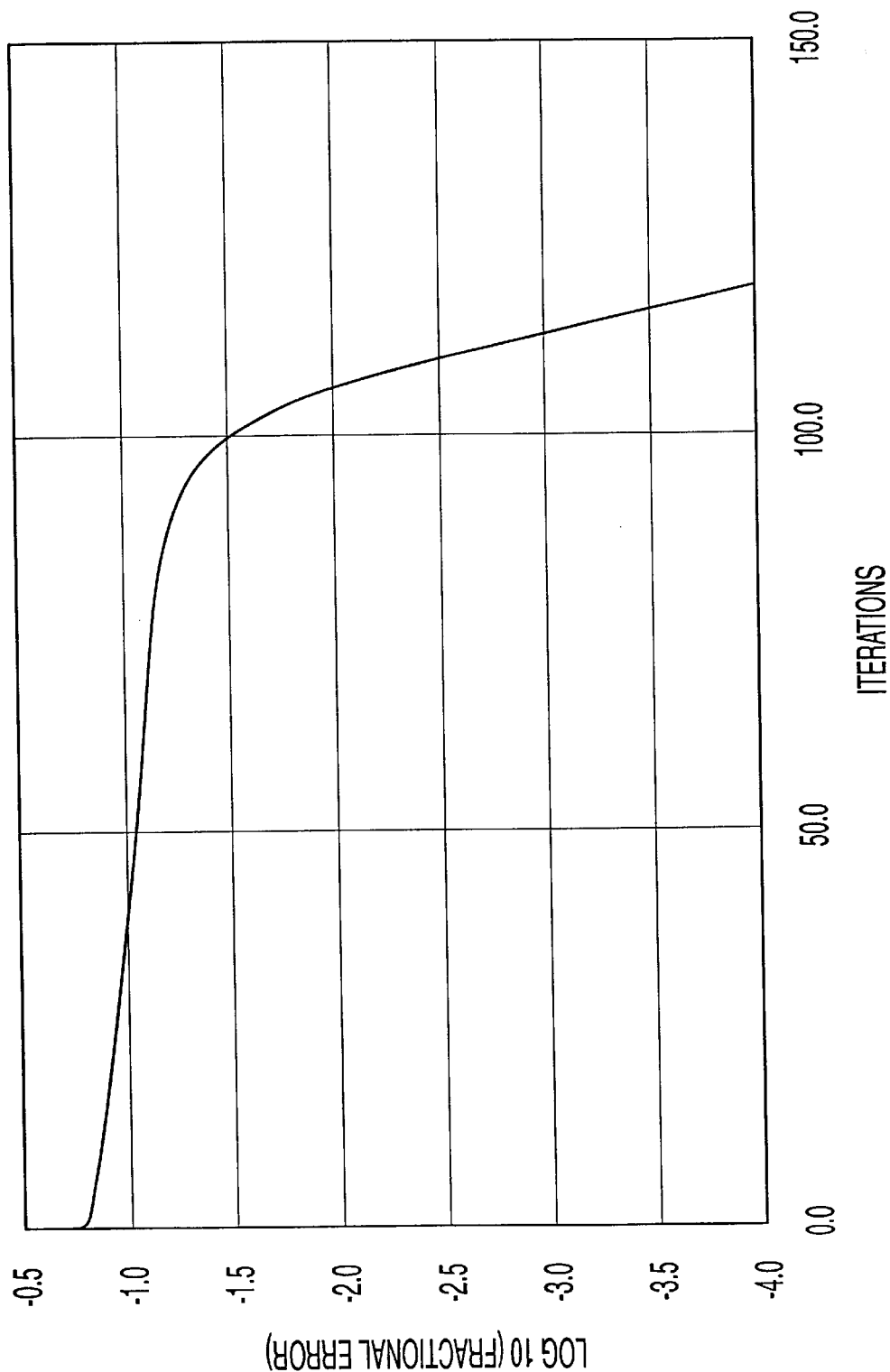
FIG. 6 is a typical graph illustrating the calculated Sum of the Squared Error (SSE) for all N images divided by their total energy (i.e., SSE/Total Energy) as a function of the number of iterations in accordance with one embodiment of the method of the present invention.

FIG. 6 illustrates a graph of the results of the second experiment using a transparent random phase object 200 and 6 different dioptric lenses 230. This graph has been made in terms of the log base 10 of the fractional error of the phasorgram as a function of the number of iterations of the method. Again, this experiment used 6 different convergent lenses 230 in the BFP 220 and used a transparent random phase object 200. As seen in the graph, the early iterations show a slow decrease in the error energy which is deemed a "search phase." During this "search phase" the fractional error decreases very slowly, of the order of less than one in one thousand per iteration. Although the error is slowly decreasing, the phase of the pixels is actually changing at a good rate. The fractional error appears to indicate the algorithm is failing, while in reality, the algorithm is moving at a good pace towards a solution. At approximately 100 iterations, there is a quite rapid closure to the final solution.

Figure 7:
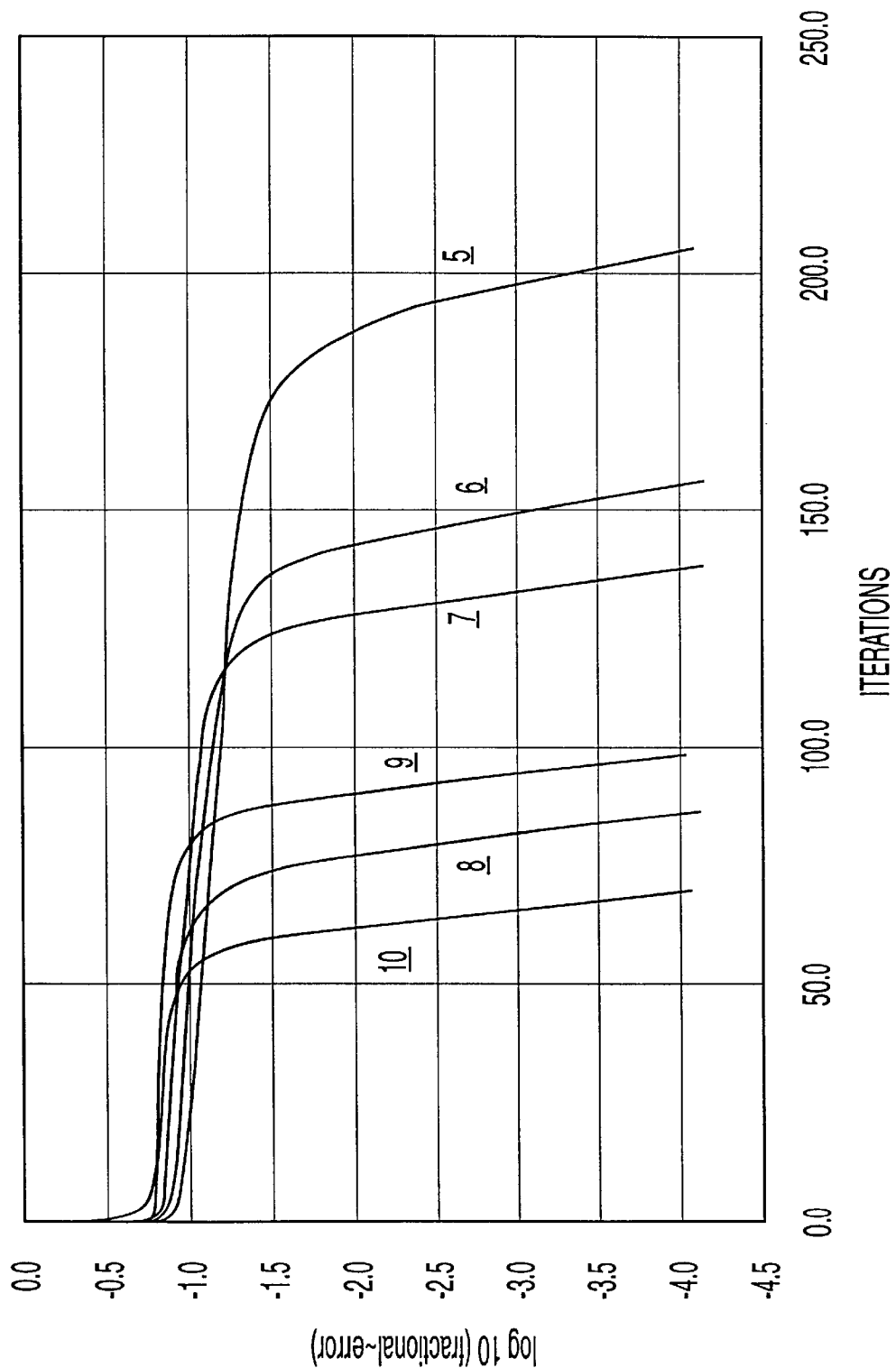
FIG. 7 is a graph illustrating the calculated Fractional Error versus the number of iterations in one embodiment of the method of the present invention for different numbers of sets of data.

FIG. 7 illustrates the results of the third experiment using 6 random phase filters 230 and the same random phase transparent object 200. Once again, this Figure illustrates a graph of the fractional error as a function of the number of iterations of the method of the present invention. Each of the curves illustrates the progress of the method with different runs using diverse numbers of phasorgrams to reconstruct the object phase. The processing which experienced the longest time used 5 phasorgrams, while the quickest one processed 10 phasorgrams. As illustrated in this Figure, each of the processes experienced the initial slow decrease with iteration number and a subsequent rapid decent of the error as the method homed in on the correct solution. Except for a minor reversal in the runs using 8 and 9 phasorgrams, it generally appeared that the more phasorgrams used, the fewer the iterations required to recover the phase distribution.

It may be noted that in the context of the above experiments attempts to recover the phase distribution with less than about 5 phasorgrams were generally unsuccessful, with the algorithm failing to reduce the fractional error beyond a practical point. It appears that the algorithm had "locked." It is unclear whether the minimum number of phasograms reaching a satisfactory solution represents a more fundamental constraint on the method. It may be of further interest to note that the original Gerchberg-Saxton algorithm could only use data from two intensity images to try and recover phase distributions, while the method of the present invention places no limit on the number of intensity images (phasorgrams) that can be used.

Figure 8:
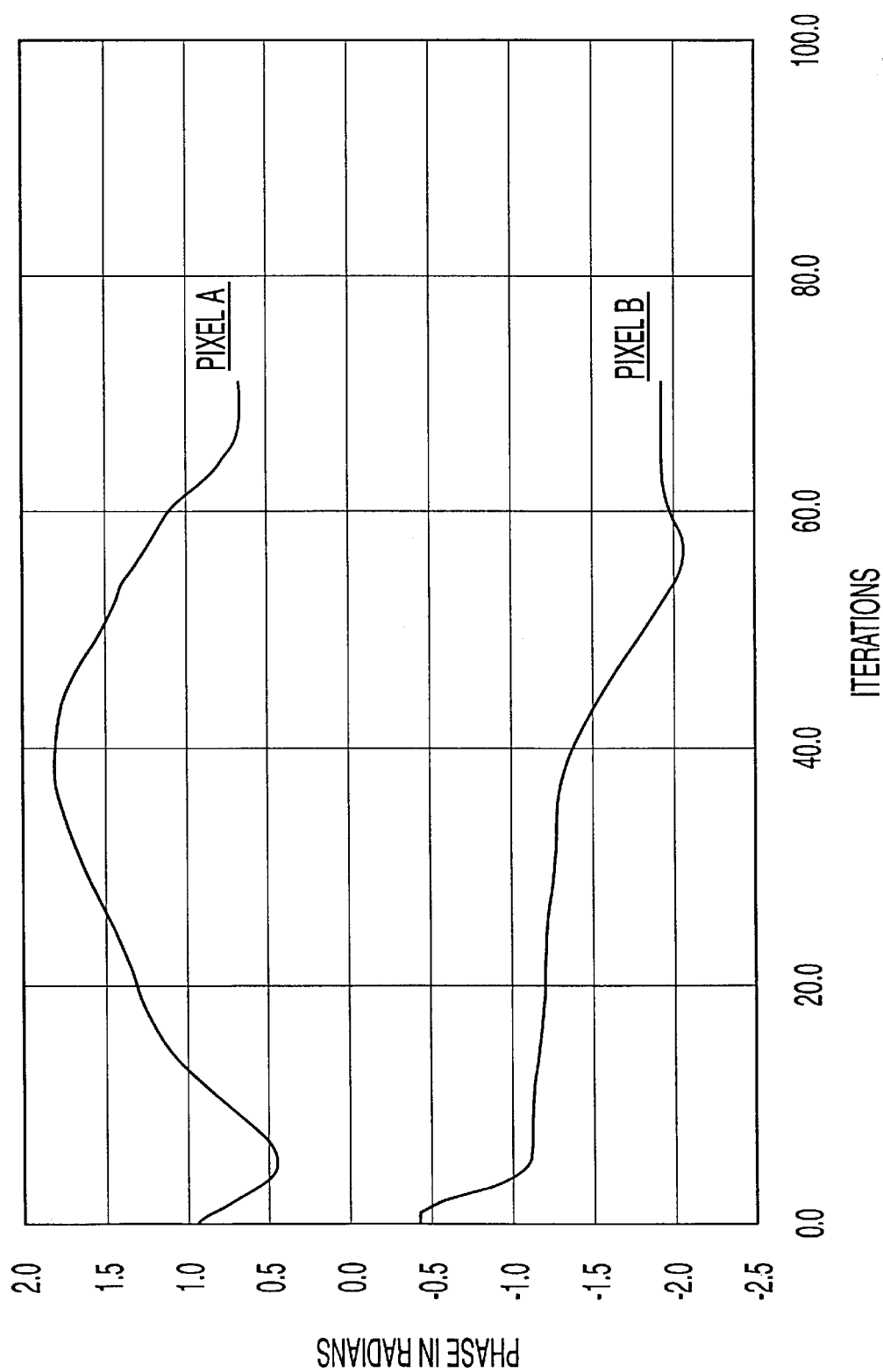
FIG. 8 shows the progression of the phase estimates of two typical pixel phasors as the computational algorithm illustrated in FIG. 3 iterates.

FIG. 8 depicts the phase of two different pixels as a function of the number of iterations. The processing of these pixels corresponds to the curve of the processing of 10 phasorgrams depicted in FIG. 7. In comparing the graphs of FIGS. 8 and 7, it is noted that during the "search phase" (approximately between the 1st and 50th iteration) even though the error is decreasing slowly (FIG. 7) the estimated phase of each of the pixels is changing quite rapidly. This rapid change in the pixel phase flattens out as the solution to the function is approached (approximately above the 60th iteration).

In a second embodiment of the present invention, data measured at the BFP 220 are used in the method of the present invention. Briefly, intensity measurements in the BFP 220 are made. This in itself is not a novel technique and does not present any conceptual difficulties. For example, it presents no problem to collect intensity values in both the BFP and IP planes in a transmission electron microscope. In certain contexts the physical realizability of achieving these data maybe more or less difficult.

In accordance with a specific embodiment of the method of the present invention, these data can be used to correct the amplitudes of the BFP estimate in step 330 of the algorithm depicted in FIG. 3. That is, once the averaged estimate for the wave in the BFP 220 is achieved, the amplitude distribution of the estimate is replaced by the measured amplitude distribution, while retaining the estimated phase distribution. Then the algorithm proceeds as before. This additional step in the algorithm appears to be quite effective in speeding up the process of finding the phase distribution of the object, as can be seen in FIG. 9.

Figure 9:
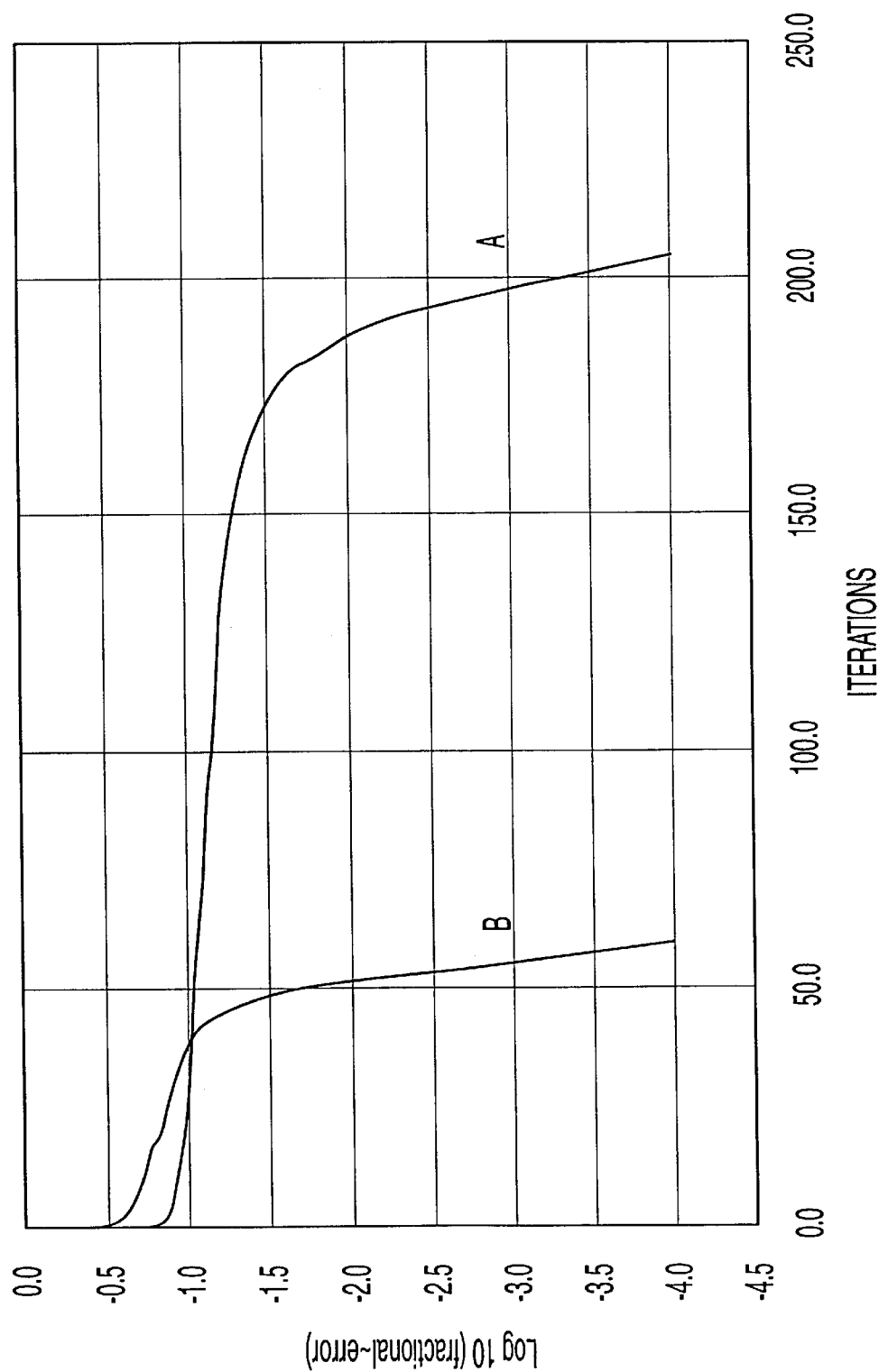
FIG. 9 is a graph of Fractional Error for an experiment run using only data from the image plane (graph A) in comparison to the same experiment using data from both the back focal plane and the image plane (graph B).

FIG. 9 illustrates a comparison between the fractional error measured using the first embodiment of the invention (with no BFP measurements) and that experienced using the second embodiment, in which measured data from the back focal plane are employed. Each of these graphs was obtained using 5 initial phasorgrams. Graph A illustrates the progress of the process using only the data measured at the image plane, while graph B indicates the progress of the method using data from both the back focal plane and image plane. As seen in FIG. 9, when the data from the back plane is used, a drastic decrease in the number of iterations required to solve the problem is experienced. As seen in FIG. 9, adding data from the BFP increases the efficacy of achieving a solution as opposed to only using the data from the image plane.

Note that in the iterative process of this invention, wherever correction involves retaining the phase estimate and correcting the pixel amplitude, another correction is also possible which may be more or less efficacious. Thus, if the $(j-1)^{th}$ phase estimate, $y_{j-1}$ of the pixel is available and the $j^{th}$ phase estimate is generated $y_j$ then the new phase $y_{j\ new}$ may be anywhere in the range $y_{j-1} < y_{j\ new} < 2y_j - y_{j-1}$. The range obviously includes $y_j$ which is the value used for $y_{j\ new}$ in the illustrations of this disclosure.

It should be apparent that while the invention has been described above in the context of reconstructing a complete wave front from intensity measurements, at least some of its utility may reside also in the ability to display or otherwise render the reconstructed wave front to a human observer. In principle, an image of the reconstructed wave front (in the case of visible light applications) could be made to appear as a hologram. The main difference would be that only one source of coherent monochromatic light would be necessary for the display. Information about the reconstructed wave front (amplitude and phase) can be encoded in an article of manufacture, that is then illuminated by the source.

In a preferred embodiment, "sculpted film" can be used to display the reconstructed wave front. Sculpted film is a new medium that is used to transform complete phase and amplitude information into an analog volumetric hologram (three-dimensional image). This film has two distinct parts.

Phase information of an image is encoded into a medium, which is known as a kinoform. The amplitude information of an image is captured on a photographic emulsion. The kinoform and emulsion are then joined. In this way both the phase information and the amplitude information of an image are united. Thus, when light is shone upon this film, complete information about the image is reproduced, and a three-dimensional image is obtained. In an alternative embodiment, the phase filter provided by Boulder Nonlinear Systems, Inc. can also be used as will be appreciated by those of skill in the art to provide the encoded phase information. The amplitude modulation may still be achieved with film or with future development of an electronically variable optic density medium.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method for recovering phase information of a wave front of a substantially monochromatic coherent waveforn comprising:
    (a) providing a lens having an associated back focal plane (BFP) and image plane (IP);
    (b) passing the wave front through the lens and through a phase filter disposed at the BFP of the lens, the phase filter imparting known phase shifts to the wave front;
    (c) recording spatial intensity values for the wave front at the IP;
    (d) repeating steps (b) and (c) N−1 times for different values of the imparted phase shifts to obtain N intensity images of the wave front at the IP;
    (e) associating phase values for each of the N intensity images of the wave front to form N synthetic wave front images;
    (f) processing the N synthetic wave front images to obtain a single estimate of the wave front at the BFP;
    (g) generating modified N synthetic wave front images based on the recorded spatial intensity values for each image, on the estimate of the wave front at the BFP and on the corresponding phase shifts; and
    (h) repeating the process in steps (f) and (g) until an error measure associated with the N synthetic wave front images reaches a predetermined threshold.

2. The method of claim 1, wherein the BFP and the IP are conjugate planes and corresponding wave front images are related by the Fourier transform.

3. The method of claim 2, wherein the conjugate planes are a back focal plane and an image plane of an optical system.

4. The method of claim 2, wherein the conjugate planes are a back focal plane and an image plane of a magnetic system.

5. The method of claim 1, wherein the phase filter is a random phase filter.

6. The method of claim 5, wherein the random phase filter has uniform distribution.

7. The method of claim 1, wherein the phase filter comprises one or more optical lenses.

8. The method of claim 7, wherein the one or more optical lenses are convergent.

9. The method of claim 8, wherein the one or more optical lenses are divergent.

10. The method of claim 1, wherein N is greater than or equal to 5.

11. The method of claim 10, wherein the phase filter comprises optical lenses, the first optical lens being a plus eight diopter lens and each subsequently used optical lens progresses in eight diopter increments.

12. The method of claim 1, wherein a cross correlation measure between the N phase filters is between +0.1 and −0.1.

13. The method of claim 1, further comprising the step of:
    recording spatial intensity values for the wave front before the wave front has passed through the phase filter.

14. The method of claim 13, wherein the step of generating modified N synthetic wave front images is based on the recorded spatial intensity values for the wave front before it has passed through the phase filter.

15. The method of claim 1, wherein the recorded intensity data are divided into pixels.

16. The method of claim 15, wherein adjacent pixels in the wave front are phase shifted by a different amount.

17. The method of claim 16, wherein adjacent pixels in the wave front are phase shifted by an amount between +π and −π.

18. The method of claim 1, wherein the wave front is formed of monochromatic partially coherent light.

19. The method of claim 1, wherein the wave front is formed of pseudo monochromatic light.

20. The method of claim 1, wherein the wave front is formed of X-rays.

21. The method of claim 1, wherein wave front is formed of electron beams.

22. The method of claim 1, wherein processing step (f) comprises the steps of:
   (i) inverse Fourier transforming each of the N synthetic wave front images to generate corresponding BFP wave front images;
   (ii) correcting each of the BFP wave front images by subtracting the known phase shifts imparted by the corresponding phase filter; and
   (iii) averaging the corrected BFP wave front images to obtain a single estimate of the wave front at the BFP.

23. The method of claim 1, wherein processing step (g) comprises the steps of:
   (i) adding the known phase shifts imparted by the corresponding phase filter to the estimate of the wave front at the BFP to obtain N modified BFP images;
   (ii) Fourier transforming each of the N modified BFP images to obtain N computed synthetic wave front images; and
   (iii) replacing amplitude values associated with the N computed synthetic wave front images with the corresponding recorded spatial intensity values.

24. The method of claim 23 further comprising the step of computing an error measure associated with the difference between the replaced amplitude values of the N computed synthetic wave front images and the corresponding recorded spatial intensity values.

25. The method of claim 24 further comprising the steps of:
   (i) recording spatial intensity values for the wave front at the BFP; and
   (ii) applying the recorded spatial intensity values for the wave front at the BFP to reduce the error measure.

26. The method of claim 22, wherein steps (i) and (ii) are performed sequentially.

27. The method of claim 22, wherein steps (i) and (ii) are performed in parallel.

28. The method of claim 23, wherein step (i) is performed in parallel.

29. The method of claim 24, wherein the computed error measure is a sum squared error (SSE) value.

30. The method of claim 29, wherein the predetermined amount is an SSE/Energy (fractional error) of less than 0.0001, where Energy is the total wave front energy.

31. A method of recovering phase information of a wave front comprising the steps of:
   (a) generating N sets of intensity data by phase shifting the wave front N different times by N different known phase shifts;
   (b) converting the N sets of intensity data to N sets of amplitude data;
   (c) associating estimated phases with the N sets of amplitude data, thereby generating N first estimated wave fronts;
   (d) generating N transformed wave fronts by Inverse Fourier transforming each of the N first estimated wave fronts;
   (e) generating N second estimated wave fronts by subtracting the known phase shifts from their respective set of transformed data;
   (f) generating an average estimated wave front by averaging the N second estimated wave fronts;
   (g) generating N third estimated wave fronts by adding the known phase shifts to the average estimated wave front;
   (h) generating N fourth estimated wave fronts by Fourier transforming the N third estimated wave fronts;
   (i) generating N corrected wave fronts by correcting each of the N fourth estimated wave fronts using the respective one of the N sets of amplitude data; and
   using the N corrected wave fronts in step (d), repeating steps (d) through (i) until the amount of correction required in step (i) is less than a predetermined amount, whereby the resulting N corrected wave fronts includes the recovered phase data.

32. A system for recovering phase information of a wave front of a substantially monochromatic coherent waveform comprising:
   a lens forming a representation of a wave front passing through it on an associated back focal plane (BFP) and on an image plane (IP);
   a phase filter disposed at the BFP, the phase filter imparting known phase shifts to the wave front;
   a first recording medium capturing intensities associated with the wave front representation formed at the IP;
   a second recording medium capturing intensities of the wave front representation formed at the back focal plane; and
   a processor recovering phase information of the wave front from the captured intensities and the known phase shifts imparted by the phase filter.

33. The system of claim 32, wherein the BFP and the IP are conjugate planes related by Fourier transformation.

34. A system for recovering phase information of a wave front of a substantially monochromatic coherent waveform comprising:
   a lens forming a representation of a wave front passing through it on an associated back focal plane (BFP) and on an image plane (IP);
   a phase filter disposed at the BFP, the phase filter imparting known phase shifts to the wave front;
   a recording medium capturing intensities associated with the wave front representation formed at the IP; and
   a processor recovering phase information of the wave front from the captured intensities and the known phase shifts imparted by the phase filter,
   wherein the phase filter comprises a plurality of phase filters sequentially disposed at the back focal plane, the plurality of additional phase filters respectively imparting different, known, phase shifts to the wave front.

35. The system of claim 32 or 34, wherein the phase filter is a random phase filter.

36. The system of claim 35, wherein the random phase filter has a uniform distribution.

37. A system for recovering phase information of a wave front of a substantially monochromatic coherent waveform comprising:
   a lens forming a representation of a wave front passing through it on an associated back focal plane (BFP) and on an image plane (IP);
   a phase filter disposed at the BFP, the phase filter imparting known phase shifts to the wave front;
   a recording medium capturing intensities associated with the wave front representation formed at the IP; and
   a processor recovering phase information of the wave front from the captured intensities and the known phase shifts imparted by the phase filter,
   wherein the phase filter comprises one or more optical lenses.

38. The system of claim 37, wherein the one or more optical lenses are convergent.

39. The system of claim 37, wherein the one or more optical lenses are divergent.

40. The system of claim 32, wherein the first and second recording media capture the intensity on a pixel by pixel basis.

41. The system of claim 32 wherein the wave front is formed of monochromatic coherent light.

42. A system for recovering phase information of a wave front of a substantially monochromatic coherent waveform comprising:

a lens forming a representation of a wave front passing through it on an associated back focal plane (BFP) and on an image plane (IP);

a phase filter disposed at the BFP, the phase filter imparting known phase shifts to the wave front;

a recording medium capturing intensities associated with the wave front representation formed at the IP; and a processor recovering phase information of the wave front from the captured intensities and the known phase shifts imparted by the phase filter, wherein the wave front is formed of X-rays.

43. A system for recovering phase information of a wave front of a substantially monochromatic coherent waveform comprising:

a lens forming a representation of a wave front passing through it on an associated back focal plane (BFP) and on an image plane (IP);

a phase filter disposed at the BFP, the phase filter imparting known phase shifts to the wave front;

a recording medium capturing intensities associated with the wave front representation formed at the IP; and a processor recovering phase information of the wave front from the captured intensities and the known phase shifts imparted by the phase filter, wherein the wave front is formed of electron beams.

44. A system for recovering phase information of a wave front of a substantially monochromatic coherent waveform comprising:

a lens forming a representation of a wave front passing through it on an associated back focal plane (BFP) and on an image plane (IP);

a phase filter disposed at the BFP, the phase filter imparting known phase shifts to the wave front;

a recording medium capturing intensities associated with the wave front representation formed at the IP; and a processor recovering phase information of the wave front from the captured intensities and the known phase shifts imparted by the phase filter, wherein the phase filter comprises N phase filters sequentially disposed at the back focal plane and the recording medium captures N sets of intensity data generated by the N phase filters.

45. An article of manufacture incorporating phase information recovered using the method of claim 1.

46. The article of manufacture of claim 45 in which phase information is encoded in kinoform.

47. The method of claim 1 further comprising the step of displaying a wave front using recovered phase information.

48. The method of claim 47, wherein the step of displaying comprises shining substantially monochromatic coherent light through an article of manufacture incorporating the recovered phase information.

49. The system of claim 32, wherein at least one of the first and second recording media is a photographic film.

50. The system of claim 32, wherein at least one of the first and second recording media is a charged coupled device (CCD) array.

51. The system of claim 34, wherein the recorded intensity data are divided into pixels and adjacent pixels in the wave front are phase shifted by different amounts.

52. The system of claim 51, wherein adjacent pixels in the wave front are phase shifted by an amount between $+\pi$ and $-\pi$.

53. The system of claim 37, wherein the number N of the optical lenses is greater than or equal to 5.

54. The system of claim 53, wherein a first optical lens of the phase filter is a plus eight diopter lens and the remaining N-1 optical lenses progress in eight diopter increments.

55. The system of claim 44, wherein N is greater than or equal to 5.

56. The system of claim 44, wherein a cross correlation measure between the N phase filters is between +0.1 and −0.1.

* * * * *